(12) United States Patent
Baxivanelis

(10) Patent No.: US 10,471,624 B2
(45) Date of Patent: Nov. 12, 2019

(54) MITER ANGLE STOP

(71) Applicant: Hilti Aktiengesellschaft, Schaan (LI)

(72) Inventor: Konstantin Baxivanelis, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/118,348

(22) PCT Filed: Feb. 11, 2015

(86) PCT No.: PCT/EP2015/052831
§ 371 (c)(1),
(2) Date: Aug. 11, 2016

(87) PCT Pub. No.: WO2015/121283
PCT Pub. Date: Aug. 20, 2015

(65) Prior Publication Data
US 2017/0173814 A1 Jun. 22, 2017

(30) Foreign Application Priority Data

Feb. 14, 2014 (EP) ..................................... 14155132

(51) Int. Cl.
*B27B 9/02* (2006.01)
*B23D 45/04* (2006.01)
(Continued)

(52) U.S. Cl.
CPC .............. *B27B 9/02* (2013.01); *B23D 45/024* (2013.01); *B23D 45/044* (2013.01); *B23D 45/14* (2013.01); *B23D 49/167* (2013.01)

(58) Field of Classification Search
CPC .................. B23D 47/00; B23D 45/044; B23D 45/067–068; B23D 45/024; B65B 61/065; B27B 9/02
(Continued)

(56) References Cited

U.S. PATENT DOCUMENTS

| 4,999,916 A | * | 3/1991 | Sistare | ...................... B27B 9/02 30/376 |
| 5,433,008 A | | 7/1995 | Barger, Jr. et al. | |

(Continued)

FOREIGN PATENT DOCUMENTS

WO WO 00/51772 A1 9/2000

OTHER PUBLICATIONS

PCT/EP2015/052831, International Search Report (PCT/ISA/220 and PCT/ISA/210) dated Mar. 23, 2015, with partial English translation, enclosing Written Opinion of the International Searching Authority (PCT/ISA/237) (Ten (10) pages).
(Continued)

*Primary Examiner* — Kenneth E Peterson
*Assistant Examiner* — Nhat Chieu Q Do
(74) *Attorney, Agent, or Firm* — Crowell & Moring LLP

(57) ABSTRACT

A device for setting the miter angle of a machine tool is disclosed. The device includes a clamping block having at least one slot, and a pivot lever on which the machine tool can be mounted and which is pivotable about a pivot point relative to the clamping block between a minimum and a maximum miter angle. The slot includes at least two stop elements offset relative to one another. A setting mechanism includes a lever element for the selection of a maximum miter angle, where the lever element includes a mating stop element is alignable in such a way corresponding to the rotational alignment of the lever element that the mating stop element is able to strike the respective stop element in accordance with the selected maximum miter angle and by which the pivoting movement of the pivot lever relative to the clamping block can be limited.

6 Claims, 12 Drawing Sheets

(51) Int. Cl.
*B23D 45/02* (2006.01)
*B23D 49/16* (2006.01)
*B23D 45/14* (2006.01)

(58) Field of Classification Search
USPC .......................... 30/391, 374–376, 388, 390
See application file for complete search history.

(56) References Cited

U.S. PATENT DOCUMENTS

| | | | | | |
|---|---|---|---|---|---|
| 5,928,763 | A | * | 7/1999 | Howie, Jr. | ................ F16B 2/00 16/417 |
| 6,055,734 | A | * | 5/2000 | McCurry | .................. B27B 9/00 30/391 |
| 6,202,311 | B1 | * | 3/2001 | Nickels, Jr. | ............... B27B 9/02 30/376 |
| 6,601,305 | B1 | | 8/2003 | Fukuoka | |
| 6,691,418 | B1 | * | 2/2004 | Lewin | ....................... B27B 9/02 30/375 |
| 7,549,229 | B2 | | 6/2009 | Aoyama et al. | |
| 2003/0131484 | A1 | | 7/2003 | Yoshida et al. | |
| 2006/0288590 | A1 | | 12/2006 | Aoyama et al. | |
| 2014/0331505 | A1 | * | 11/2014 | Kume | .................... B23D 59/00 30/390 |

OTHER PUBLICATIONS

Chinese Office Action issued in Chinese counterpart application No. 201580007895.4 dated Feb. 1, 2018, with English translation (Twelve (12) pages).

\* cited by examiner

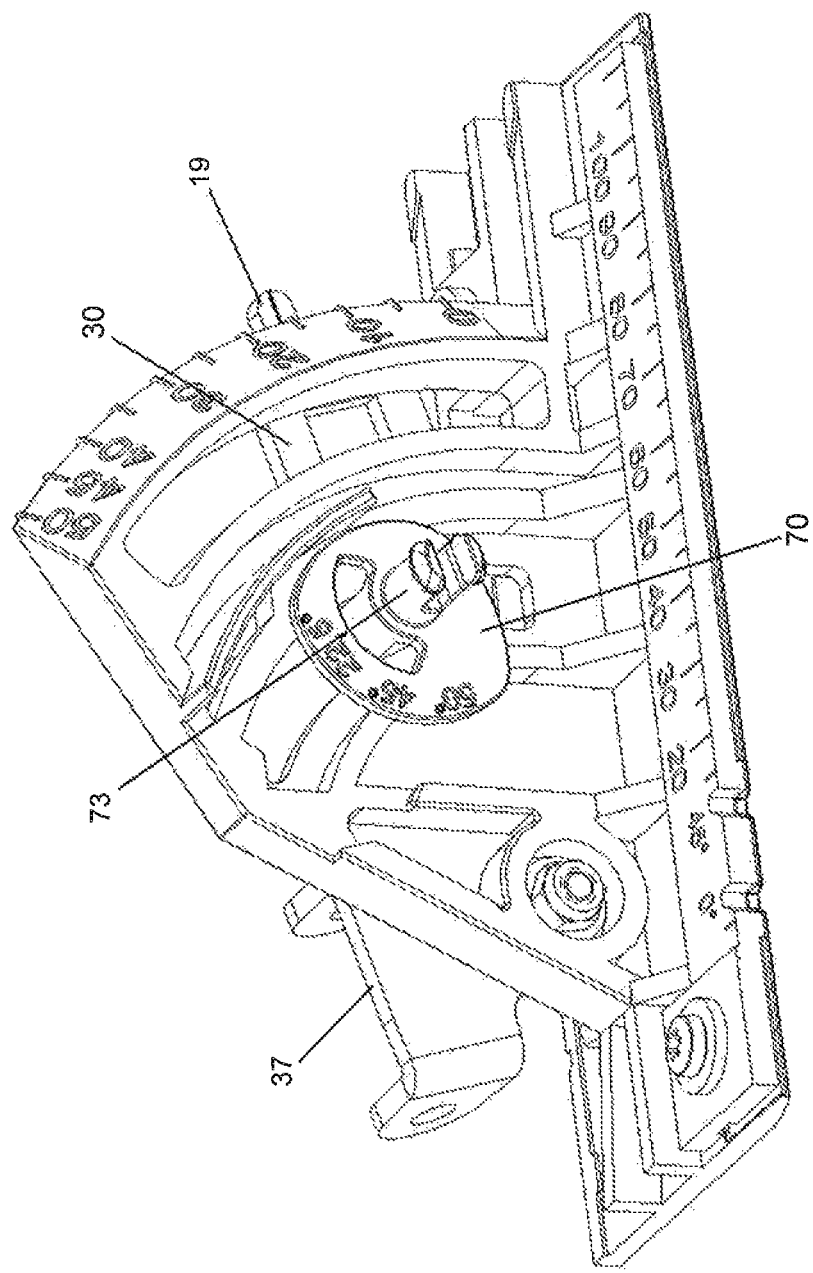

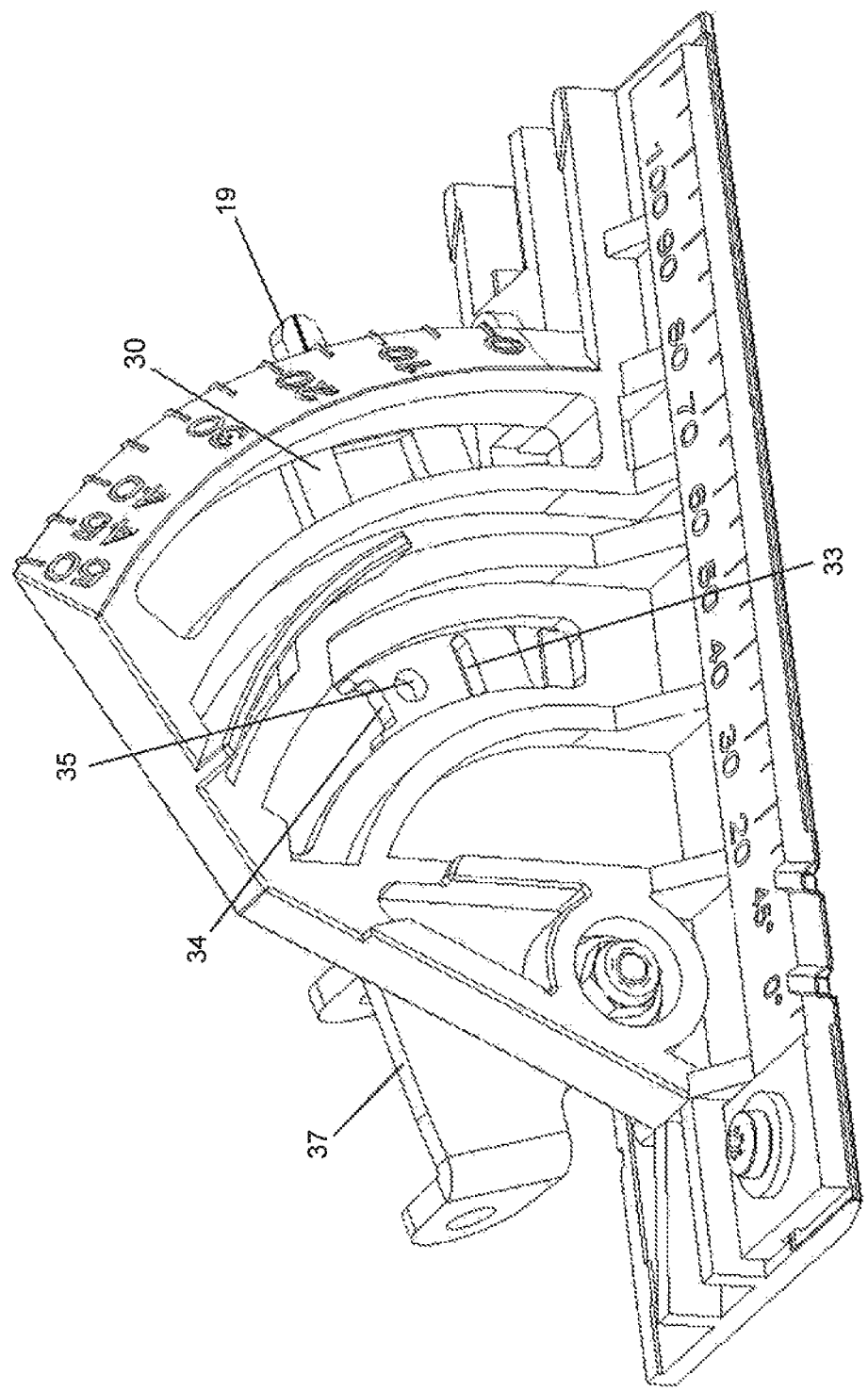

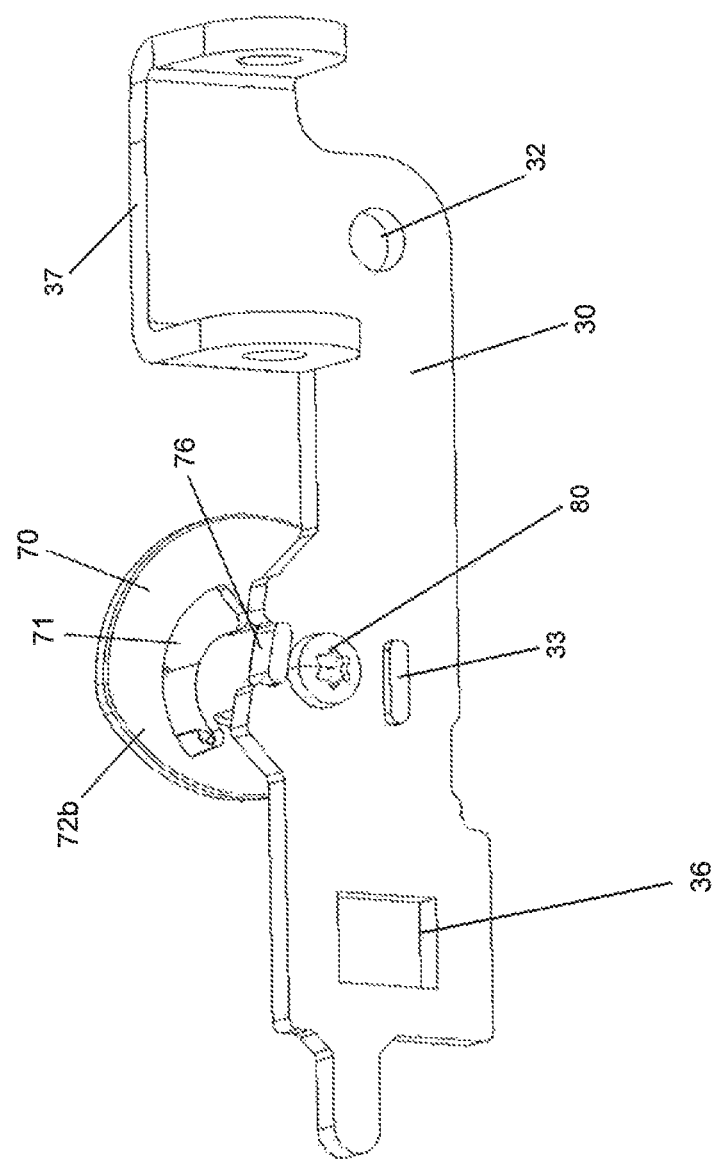

MITER ANGLE STOP

This application claims the priority of International Application No. PCT/EP2015/052831, filed Feb. 11, 2015, and European Patent Document No. 14155132.5, filed Feb. 14, 2014, the disclosures of which are expressly incorporated by reference herein.

BACKGROUND AND SUMMARY OF THE INVENTION

The invention presented here relates to a device for setting the miter angle of a machine tool, in particular a circular saw, comprising a clamping block having at least one slot, and to a pivot lever, on which the machine tool can be mounted and which is supported such that the pivot lever can be pivoted around a pivot point relative to the clamping block between a minimum miter angle and a maximum miter angle.

For a variety of machine tools, it is advantageous for the angle between an essentially horizontal guide plane and an essentially vertical work plane of the tool, i.e., one that is positioned at a right angle in relation to the horizontal guide plane, to be adjustable. The angle adjustment and/or angle setting of the vertical work plane of the saw-blade in relation to the horizontal guide plane of the saw is an important feature of the circular or compass saw, in particular. This setting possibility is especially important for the selection of the miter angle.

An angle setting device for application in a machine tool, in particular a circular saw, is disclosed according to prior art in the U.S. Pat. No. 5,433,008. In particular, U.S. Pat. No. 5,433,008 demonstrates a circular saw with a motor housing and a base plate. The base plate contains a recess, through which a circular saw-blade is inserted. The saw-blade is powered via a motor. Along with the saw-blade, the motor housing can be pivoted and secured in relation to the base plate via an angle setting device. For this purpose, the angle setting device consists of a clamping block with a curved slot as well as an elongated pivoting device. The clamping block is firmly attached to the base plate, and the pivoting device is firmly attached to the motor housing and the saw-blade. The pivoting device can be pivoted relative to the clamping block via a pivot point, such that the angle between the motor housing and the saw-blade can be adjusted. With the assistance of a rotating element that contains a shaft with a recess, the maximum pivoting range of the pivoting device can be increased or decreased.

The disadvantages of this angle setting device according to prior art are the complex construction design as well as the imprecise setting possibility of the maximum pivoting range (i.e., maximum miter angle) for the machine tool.

It is thus the task of the invention presented here to provide an improved angle setting device, through which the aforementioned problems can be overcome and which, in particular, demonstrates a less complex construction design.

A device is thus provided for the setting of the miter angle for application in a machine tool, in particular a circular saw, comprising a clamping block having at least one slot, and to a pivot lever, on which the machine tool can be mounted and which is supported such that the pivot lever can be pivoted around a pivot point relative to the clamping block between a minimum miter angle and a maximum miter angle.

According to the invention, the slot comprises at least two stop elements positioned so as to be offset relative to one another, as well as a setting mechanism having a lever element for the selection of a maximum miter angle, wherein the lever element comprises a mating stop element that can be aligned in such a way corresponding to the rotational alignment of the lever element that the mating stop element is able to strike the respective stop element in accordance with the selected maximum miter angle, by which means the pivoting movement of the pivot lever relative to the clamping block for setting the maximum miter angle can be limited. Through the combination of the lever element with the mating stop element in the setting mechanism, the maximum miter angle can be simply set in a space-saving manner.

According to a further advantageous exemplary embodiment of the invention presented here, it can be provided that the setting mechanism comprises an indicator and limiting element, which comprises an indicator scale as well as an elongated recess, wherein the indicator scale serves to indicate the selectable maximum miter angle, and the elongated recess serves to guide and limit the rotational motion of the mating stop element. The elongated recess can effectively hinder the mating stop element from accidentally being rotated too widely, i.e., outside of the range of the maximum miter angle to be selected.

The invention presented here will be further explained with regards to advantageous exemplary embodiments, with the assistance of the following illustrations.

BRIEF DESCRIPTION OF THE DRAWINGS

FIG. 4 is a perspective front view of the device according to the invention for setting the miter angle without the lever element;

FIG. 5 is a perspective front view of the device according to the invention for setting the miter angle without the setting mechanism;

FIG. 11 is a rear view of a pivot lever along with the indicator and limiting element;

DETAILED DESCRIPTION OF THE DRAWINGS

Figure 1:
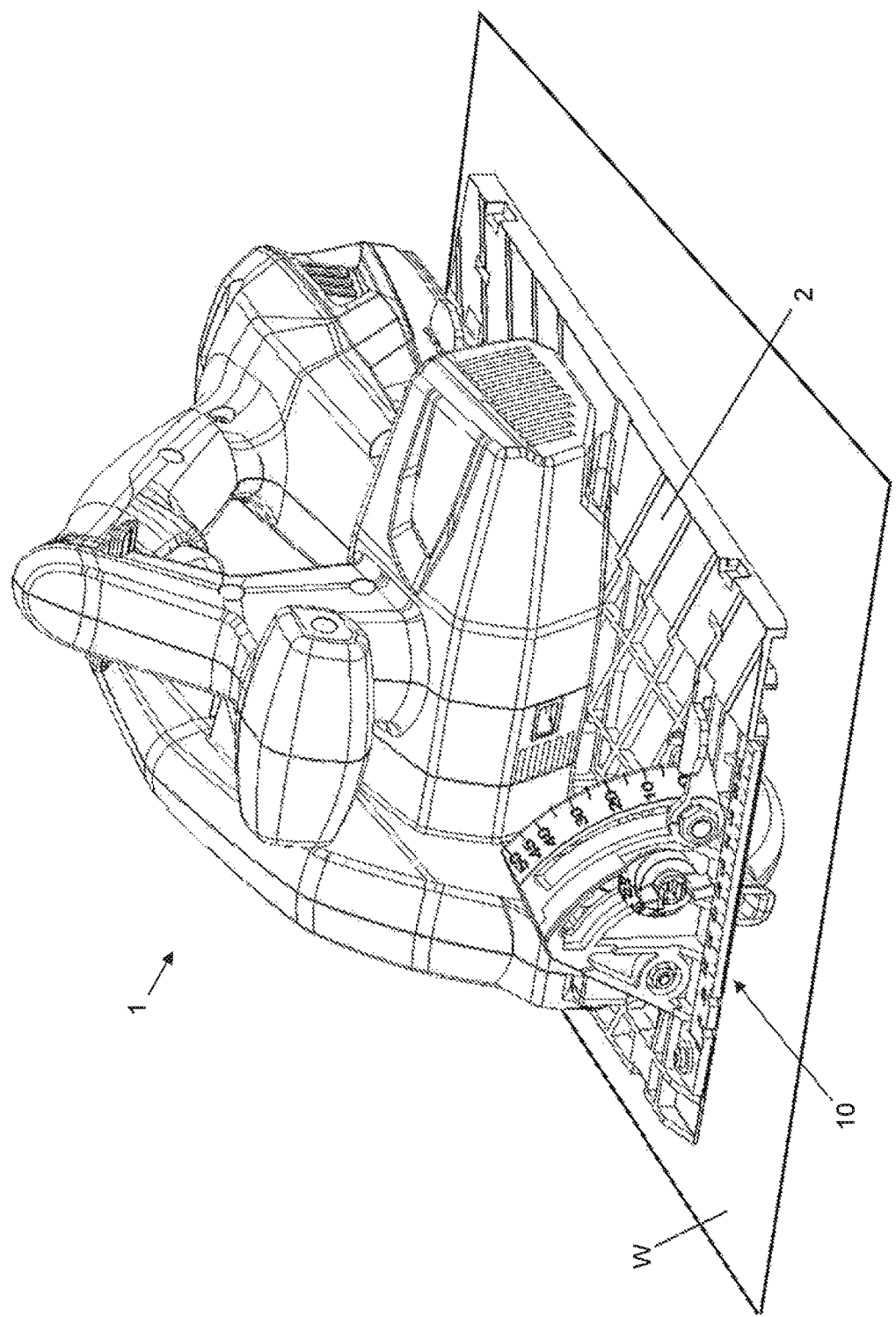
FIG. 1 is a perspective view of a machine tool with the device according to the invention for setting the miter angle in a horizontal alignment.

FIG. 1 shows a machine tool 1 in the embodiment of a circular saw. The circular saw 1 comprises a device 10 for setting the miter angle of the circular saw 1 for the working support structure W.

Figure 2:
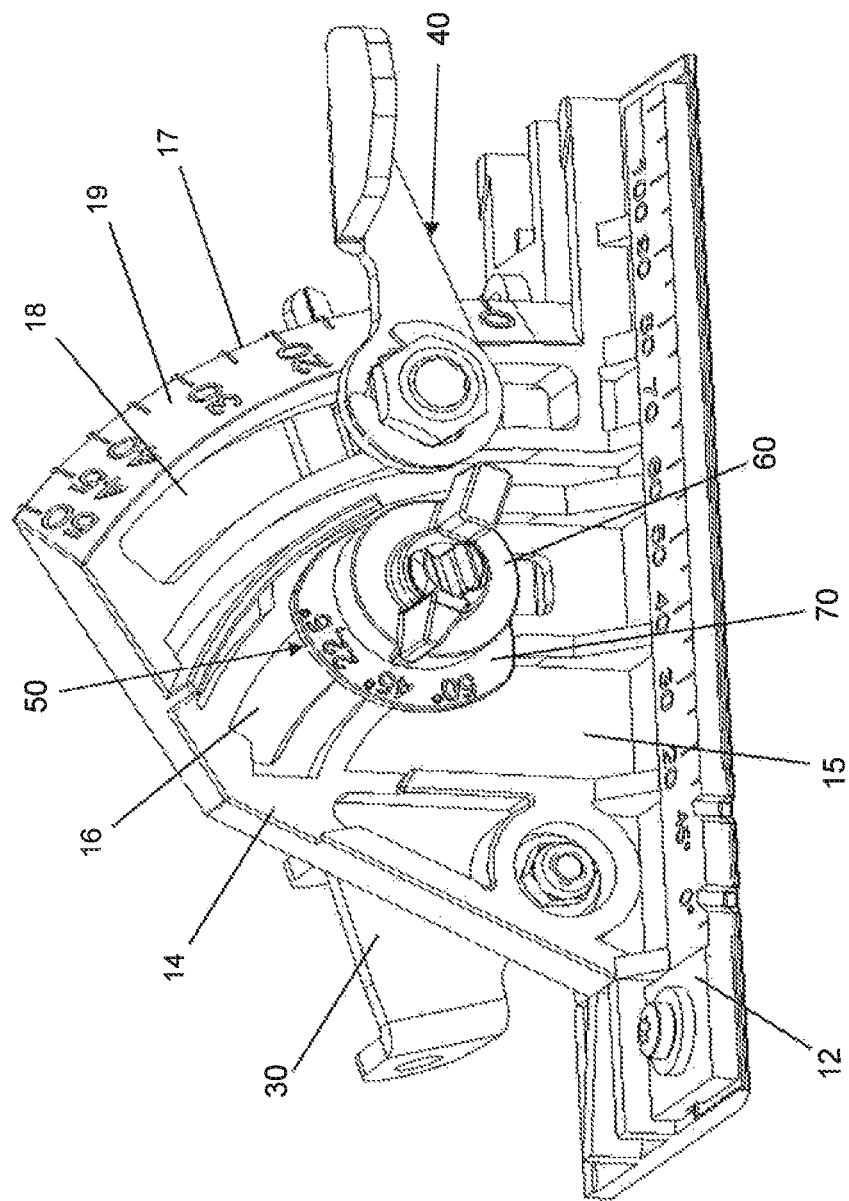
FIG. 2 is a perspective front view of the device according to the invention for setting the miter angle.

As shown in FIG. 2, for the setting of the miter angle, the device 10 fundamentally comprises a base plate 12, a clamping block 14, a pivot lever 30, and a setting mechanism 50.

The base plate 12 of the device 10 is a component of the work surface 2 of the circular saw 1 (cf. FIG. 1).

The clamping block 14 is positioned at a right angle to the base plate 12 as well as to the work surface 2 of the circular saw 1. The clamping block 14 is fundamentally designed as a sector-shaped plate 15 and comprises a first slot 16 and a second slot 18. Both the first slot 16 and the second slot 18 are slightly curved. A scale 19 for indicating the miter angle is provided at the arc edge 17 of the plate 15 (cf. FIG. 1 through 5). As shown especially in FIG. 15, the first slot 16 features a first stop element 20, a second stop element 22, and a third stop element 24.

Figure 3:
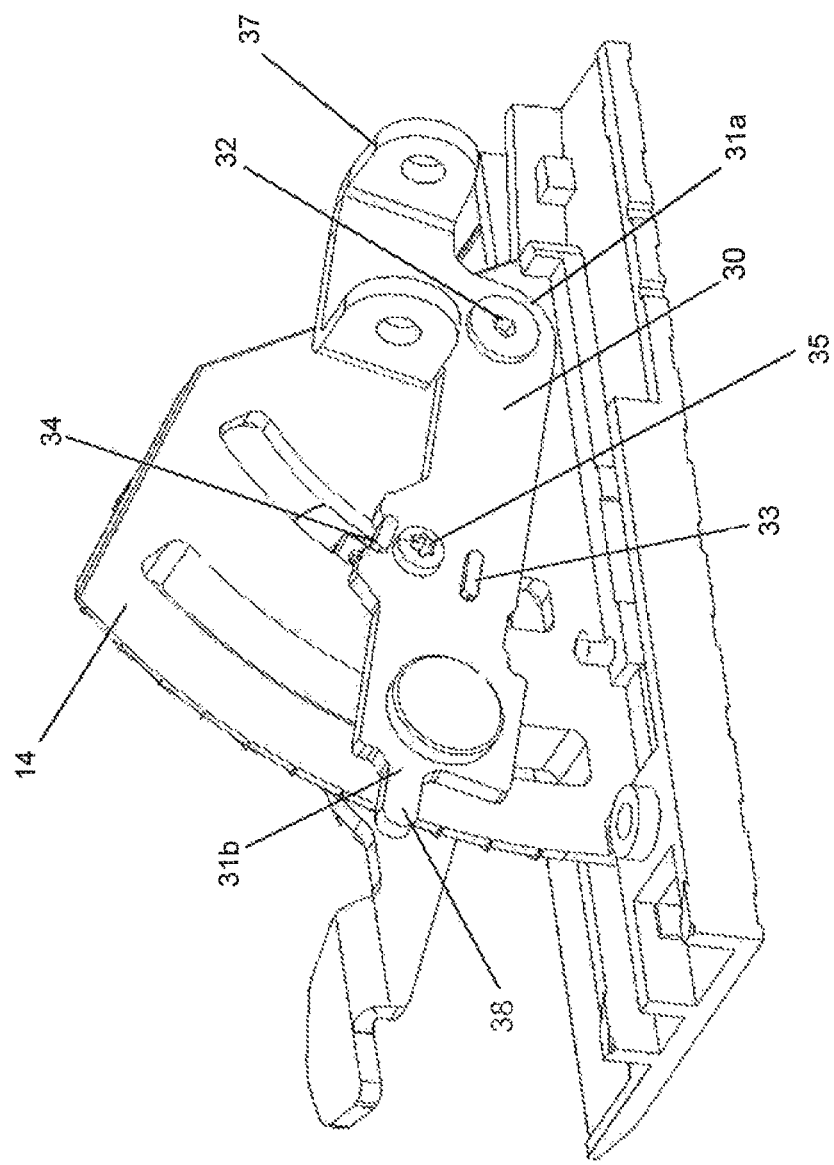
FIG. 3 is a perspective rear view of the device according to the invention for setting the miter angle.

As shown especially in FIGS. 3 and 11, the pivot lever 30 is fundamentally designed in the form of an elongated rod with a first end 31a and a second end 31b. Additionally, the pivot lever 30 comprises a first circular opening 32, a first elongated recess 33 and a second elongated recess 34, a second circular opening 35, as well as a right-angle opening 36. Further, the pivot lever 30 features a receiving device 37 for receiving the rest of the circular saw 1.

At the first end 31a, the pivot lever 30 is attached to the clamping block 14 through the first circular opening 32 in a rotating and pivoting manner. The pivot lever 30 can fundamentally be pivoted over the entire width of the clamping block 14. A point 38 in the form of a finger is positioned at the second end 31b of the pivot lever 30. The point 38 serves to indicate the set miter angle on the indicator scale 19 of the clamping block 14.

In the vicinity of the second end 31b, a right-angle opening 36 is positioned, which is provided for receiving a clamping device 40. The clamping device 40 is positioned in the second slot 18 of the clamping block 14 and serves to hold the pivoting lever 30, and with it the rest of the circular saw 1, in the selected miter angle in a releasable manner.

Between the first end 31a and the second end 31b, the first and second elongated recesses 33, 34 as well as the second circular opening 35 are positioned. The first and second elongated recesses 33, 34 as well as the second circular opening 35 are provided to receive the setting mechanism 50. The setting mechanism 50 is positioned in the first slot 16 of the clamping block 14 (cf. FIGS. 2 through 5).

The setting mechanism 50 fundamentally comprises a lever element 60 as well as an indicator and limiting element 70.

Figure 7:
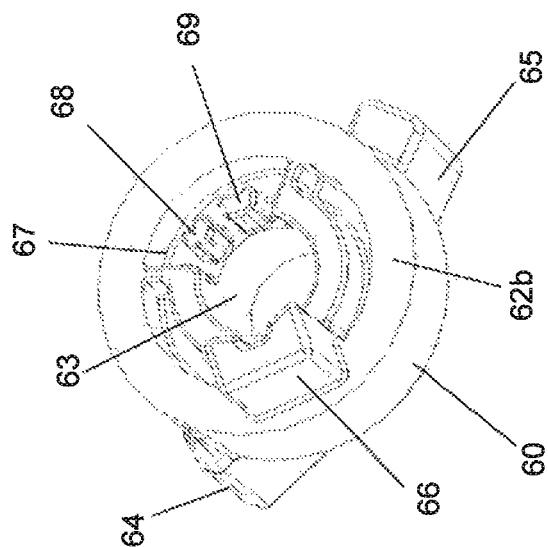
FIG. 7 is a perspective rear view of the lever element.
Figure 6:
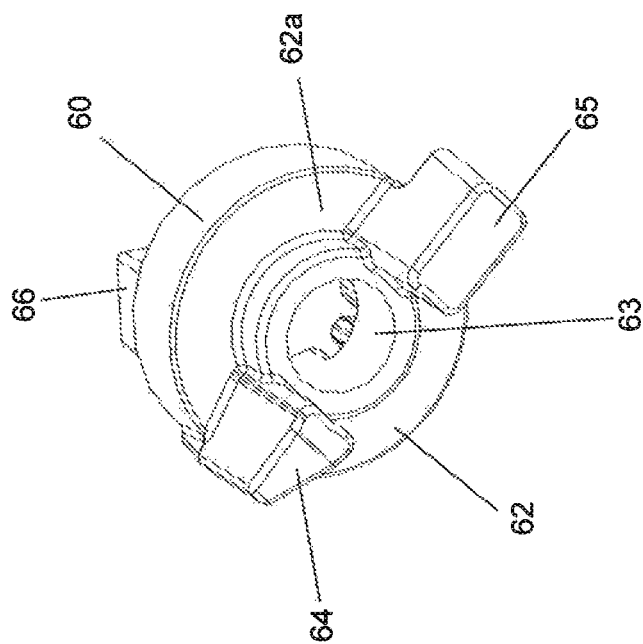
FIG. 6 is a perspective front view of the lever element.

As shown in FIGS. 6 and 7, the lever element 60 in turn comprises a cylindrical base structure 62 with a central recess 63. On the first surface 62a of the cylindrical base structure 62, a first protrusion 64 and a second protrusion 65 are mounted. Both of the protrusions 64, 65 serve to engage the setting mechanism 50 and set it manually at a specified maximum miter angle. The first protrusion 64 features a sharply tapered form (arrow form), which is provided as an indicating method for the selected maximum miter angle.

A mating stop element 66 designed as a protrusion is positioned on the second surface 62b of the cylindrical base structure 62 (cf. FIG. 7). The mating stop element 66 serves as a mating stop for each of the stop elements 20, 22, 24 of the first slot 16 in the clamping block 14. Additionally, the second surface 62b of the cylindrical base structure 62 features a cavity 67 that comprises two protrusions 68, 69. Both protrusions 68, 69 consist of an elastic material that allows a specific bending of both protrusions 68, 69.

Figure 9:
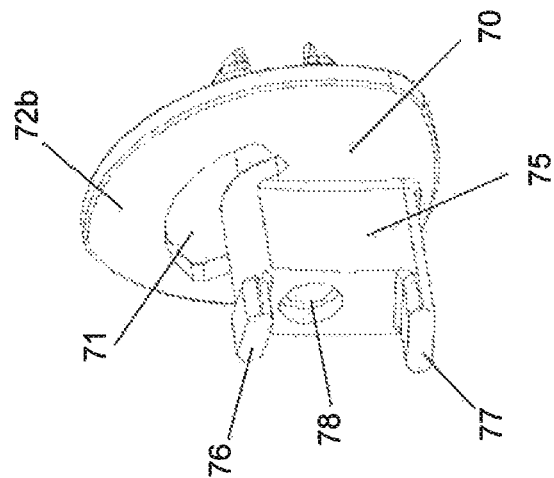
FIG. 9 is a perspective rear view of the indicator and limiting element.
Figure 8:
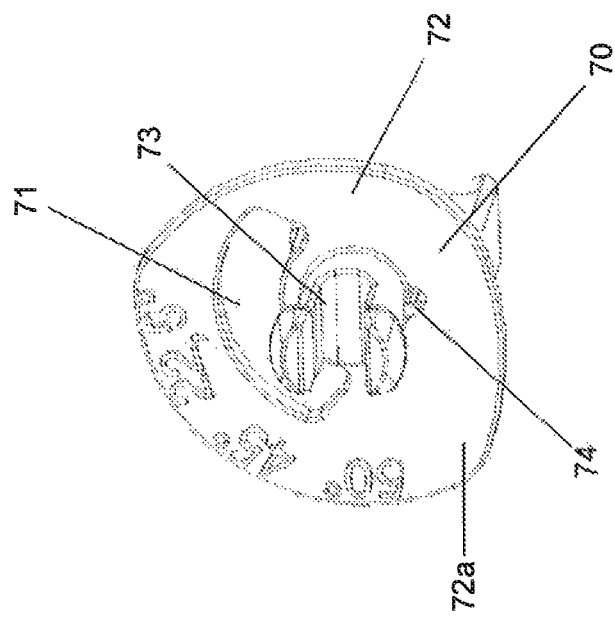
FIG. 8 is a perspective front view of the indicator and limiting element.

As shown in FIGS. 8 and 9, the indicator and limiting element 70 fundamentally consists of a disc-shaped base structure 72. The base structure 72 comprises a first surface 72a and a second surface 72b. Additionally, the indicator and limiting element 70 comprises a curved recess 71, which serves to receive the mating stop element 66 of the lever element 60 as well as guide it and limit its rotational motion relative to the indicator and limiting element 70.

Figure 10:
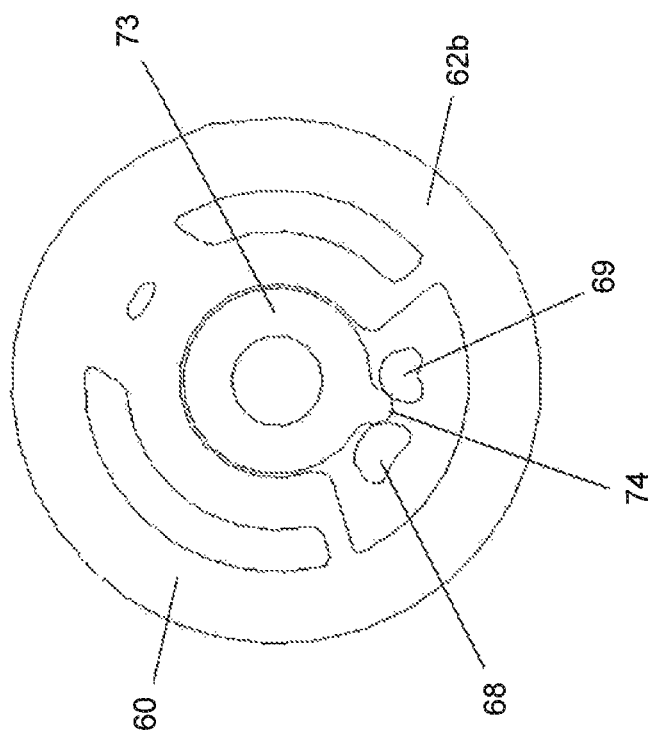
FIG. 10 is a front view of the indicator and limiting element along with the lever element.

On the first surface 72a there are three angle indicators as an indicator scale 72c, namely 22.5°, 45°, and 50°, which can be selected as the maximum miter angle of the circular saw 1. There is a bearing pin 73 on the first surface 72a, which is provided to receive the lever element 60. A latching surface 74 designed as a small protrusion is positioned at the base of the bearing pin 73. The latching surface 74 consists of a rigid material and is designed such that it moves past the two protrusions 68, 69 in the cavity 67 of the cylindrical base structure 62 of the lever element 60 with a specific effort and can be positioned between the two protrusions 68, 69 when the lever element 60 and the indicator and limiting element 70 are in close contact with one another (cf. FIG. 10). The interplay of the latching surface 74 of the bearing pin 73 with the two protrusions 68, 69 serves two purposes: first, to prevent a slight turning or accidental rotation of the lever element 60 relative to the indicator and limiting element 70, in that the protrusions 68, 69 offer a certain resistance; and second, to give the lever element 60 a certain stop and guide position for setting the selected maximum miter angle.

A right-angle protrusion 75 is positioned on the second surface 72b of the base structure 72 of the indicator and limiting element 70. The protrusion 75 features a first end and a second end. The first end attaches the protrusion 75 to the second surface 72b of the base structure 72. There are two nose elements 76, 77 at the second end. Additionally, a blind bore 78 is contained in the right-angle protrusion 75.

Both nose elements 76, 77 serve to be inserted into the first and second elongated recesses 33, 34 of the pivot lever 30. The blind bore 78 serves to receive a bolt 80, which is driven through the second circular opening 35 of the pivot lever 30. With the assistance of the nose elements 76, 77 in the elongated recesses 33, 34 and the bolt 80 in the blind bore 78, the indicator and limiting element 70 is attached along with the setting mechanism 50 to the pivot lever 30.

In the fully assembled condition of the device for setting the miter angle, the clamping block 14 is vertically attached to the base plate 12.

As shown in FIG. 3, the pivot lever 30 is joined to the clamping block 14 through the first circular opening 32 in a rotating and pivoting manner. The second circular opening 35 of the pivot lever 30 is positioned in line with the first slot 16 of the clamping block 14 (cf. FIG. 5). As described above, the setting mechanism 50 is attached to the pivot lever 30 at the second circular opening 35. As shown in FIG. 11, for the purposes of mounting the setting mechanism 50, the indicator and limiting element 70 is bolted to the pivot lever 30. The two nose elements 76, 77 are placed in the first and second elongated recesses 33, 34 to guide the indicator and limiting element 70. The indicator and limiting element 70 is joined to the pivot lever 30 and the clamping block 14 in a non-rotating manner.

Figure 13:
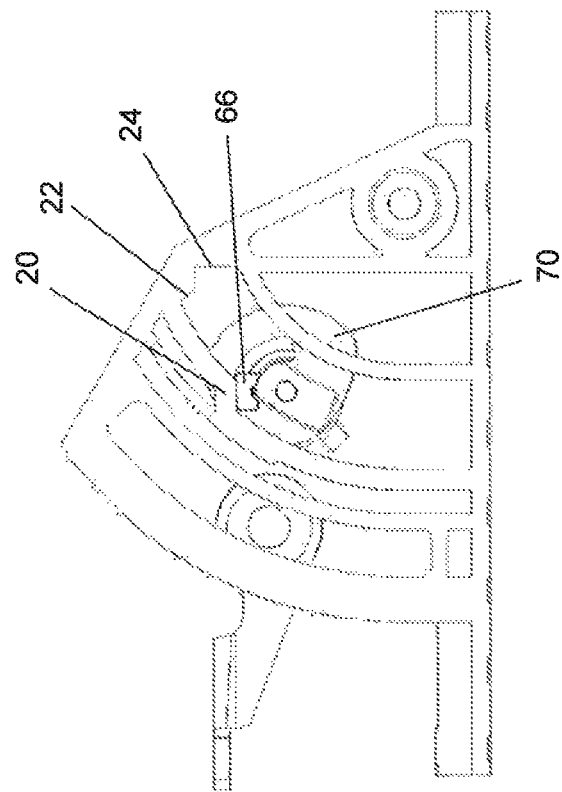
FIG. 13 is a rear view of the device for setting the miter angle in a 22.5° position.
Figure 12:
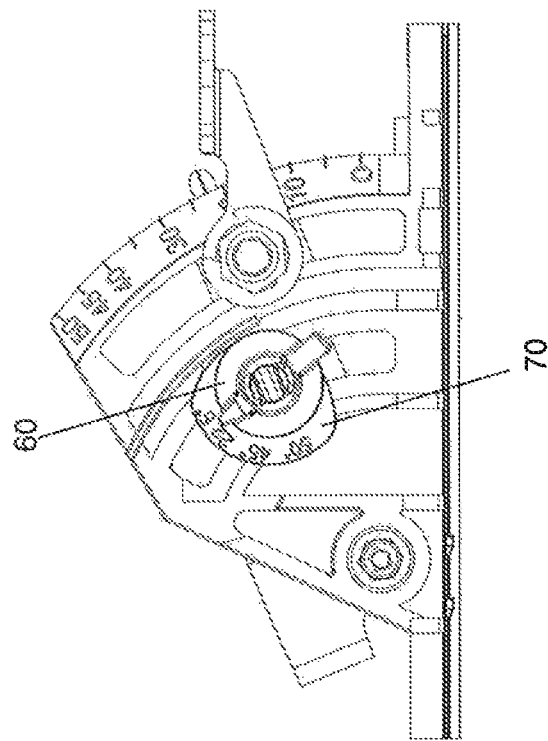
FIG. 12 is a front view of the device for setting the miter angle in a 22.5° position.

The lever element 60 is placed on the bearing pin 73 in such a way that the mating stop element 66 is positioned above the pivot lever 30 and in the recess 71 as well as in the first slot 16 of the clamping block 14. The lever element 60 is positioned such that it can be rotated towards the pivot lever 30 and the clamping block 14. By turning the lever element 60, a maximum miter angle is set, with the first protrusion 64 with the sharply tapered form at the appropriate marking of the scale (angle indicators 22.5°, 45°, and 50°) of the indicator and limiting element 70, and the mating stop element 66 is aligned in the first slot 16 of the clamping block 14 in such a way that the mating stop element 66 strikes the stop element 20, 22, or 24 in correspondence with the selected maximum miter angle. As can be seen in FIG. 12, the value of 22.5° as the maximum miter angle has been selected using the lever element 60. As shown in FIG. 13, the mating stop element 66 is correspondingly aligned in the first slot 16 in such a way that the mating stop element 66 strikes the first stop element 20. The circular saw 1 is thus positioned in a miter angle of 22.5°.

Figure 15:
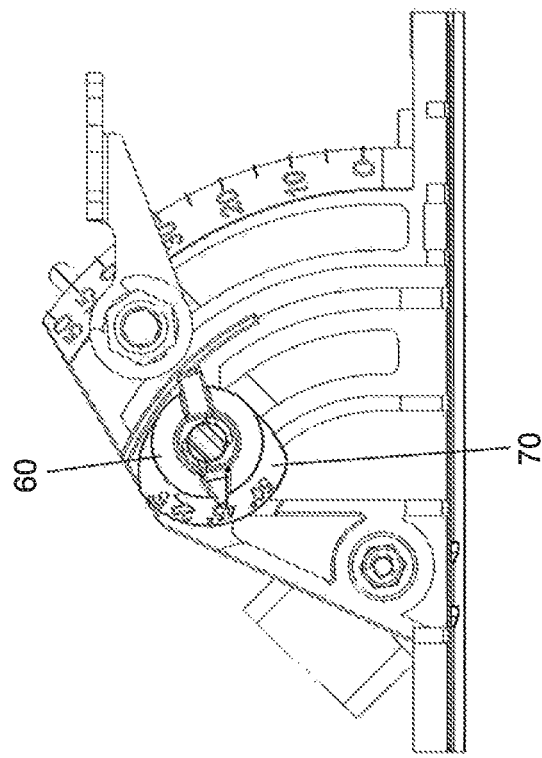
FIG. 15 is a rear view of the device for setting the miter angle in a 45° position.
Figure 14:
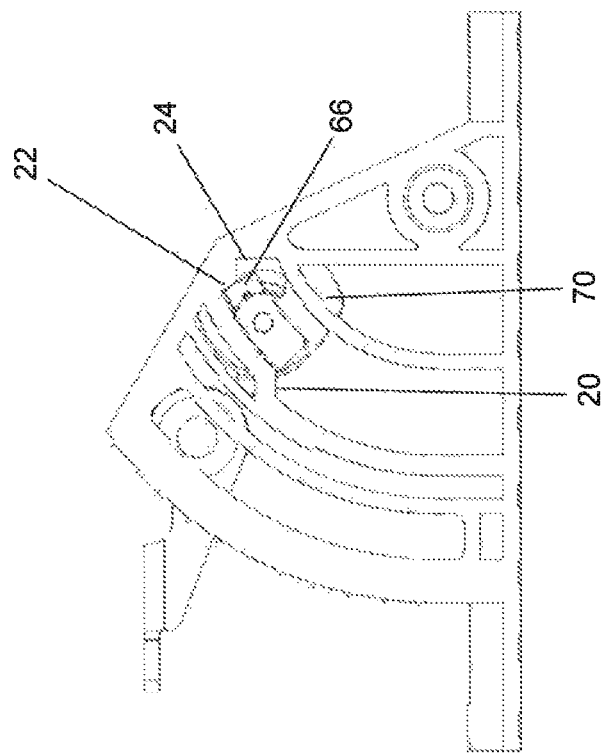
FIG. 14 is a front view of the device for setting the miter angle in a 45° position.

As can be seen in FIG. 14, the value of 45° as the maximum miter angle has been selected using the lever element 60. As shown in FIG. 15, the mating stop element 66 is correspondingly aligned in the first slot 16 in such a way that the mating stop element 66 strikes the second stop element 22. The circular saw 1 is thus positioned in a miter angle of 45°.

Figure 16:
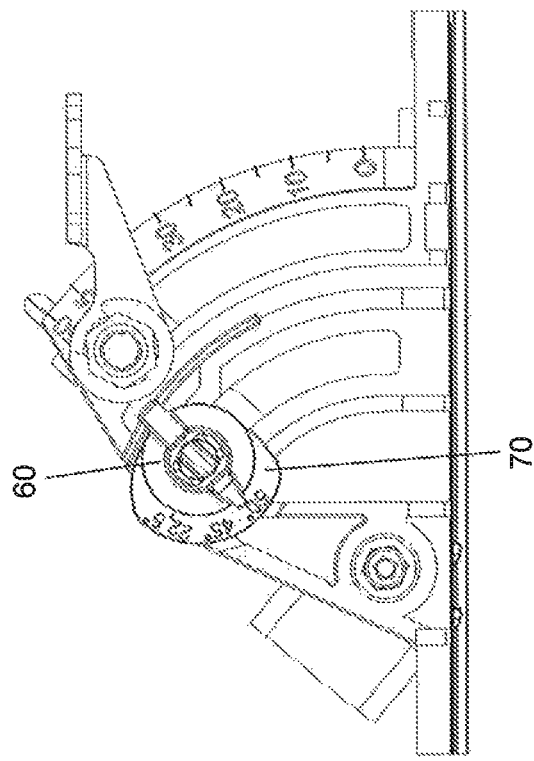
FIG. 16 is a front view of the device for setting the miter angle in a 50° position.
Figure 17:
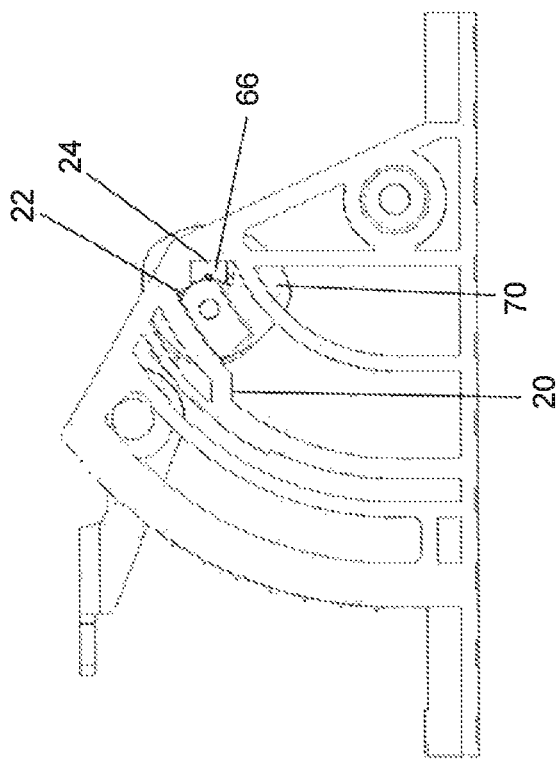
FIG. 17 is a rear view of the device for setting the miter angle in a 50° position.

As can be seen in FIG. 16, the value of 50° as the maximum miter angle has been selected using the lever element 60. As shown in FIG. 17, the mating stop element 66 is correspondingly aligned in the first slot 16 in such a way that the mating stop element 66 strikes the third stop element 24. The circular saw 1 is thus positioned in a miter angle of 50°.

It should be noted that in FIGS. 12 through 17, the pivot lever 30 is not shown and/or hidden.

After the maximum miter angle has been set, it is fixed using the clamping device 40 in such a way that the circular saw 1 is held in the selected miter angle and can be utilized in the corresponding manner.

The invention claimed is:

1. A device for setting a miter angle of a machine tool, comprising:
    a clamping block with a slot, wherein the slot includes at least two stop elements that are positioned offset relative to one another at a first end of the slot;
    a pivot lever, wherein the machine tool is mountable on the pivot lever and wherein the pivot lever is pivotable around a pivot point relative to the clamping block between a minimum miter angle and a maximum miter angle; and
    a setting mechanism that includes a lever element for selection of the maximum miter angle, wherein the lever element includes a mating stop element that strikes a respective one of the at least two stop elements based on a selected maximum miter angle;
    wherein the at least two stop elements include a first stop element, a second stop element, and a third stop element and wherein the mating stop element respectively strikes each of the first stop element, the second stop element, and the third stop element to set a respective corresponding first miter angle, a second miter angle, and a third miter angle;
    wherein the setting mechanism further includes an indicator and limiting element, wherein the indicator and limiting element includes an indicator scale and an elongated recess, wherein the indicator scale indicates a selectable maximum miter angle, and wherein the elongated recess guides and limits a rotational motion of the mating stop element.

2. The device according to claim 1, wherein the machine tool is a circular saw.

3. The device according to claim 1, wherein the mating stop element is a protrusion.

4. The device according to claim 1, wherein the lever element includes the mating stop element on a first side of the lever element and wherein the lever element includes a first protrusion and a second protrusion on a second side of the lever element.

5. The device according to claim 4, wherein the first protrusion is tapered.

6. The device according to claim 4, wherein the second side defines a cavity and wherein a first elastic protrusion and a second elastic protrusion are disposed in the cavity.

* * * * *